US012809032B2

(12) United States Patent
Noguchi

(10) Patent No.: US 12,809,032 B2
(45) Date of Patent: Nov. 24, 2026

(54) CONTROLLING A VEHICLE BASED ON A CURB AND GROUND DETECTION

(71) Applicants: PIONEER CORPORATION, Tokyo (JP); PIONEER SMART SENSING INNOVATIONS CORPORATION, Tokyo (JP)

(72) Inventor: Ryoji Noguchi, Kawagoe (JP)

(73) Assignees: PIONEER CORPORATION, Tokyo (JP); PIONEER SMART SENSING INNOVATIONS CORPORATION, Tokyo (JP)

( * ) Notice: Subject to any disclaimer, the term of this patent is extended or adjusted under 35 U.S.C. 154(b) by 47 days.

(21) Appl. No.: 18/836,120

(22) PCT Filed: Feb. 10, 2022

(86) PCT No.: PCT/JP2022/005353

§ 371 (c)(1),
(2) Date: Aug. 6, 2024

(87) PCT Pub. No.: WO2023/152871

PCT Pub. Date: Aug. 17, 2023

(65) Prior Publication Data

US 2025/0044455 A1 Feb. 6, 2025

(51) Int. Cl.

*G01S 17/931* (2020.01)
*B60W 40/06* (2012.01)
*G01S 17/89* (2020.01)

(52) U.S. Cl.

CPC ........... *G01S 17/931* (2020.01); *B60W 40/06* (2013.01); *G01S 17/89* (2013.01)

(58) Field of Classification Search

None

See application file for complete search history.

(56) References Cited

U.S. PATENT DOCUMENTS

2011/0063097 A1 3/2011 Naka et al.
2012/0185167 A1 7/2012 Higuchi et al.
(Continued)

FOREIGN PATENT DOCUMENTS

CN 109254289 A 1/2019
EP 2461305 A1 6/2012
(Continued)

OTHER PUBLICATIONS

Patent Cooperation Treaty, International Search Report, Application No. PCT/JP022/005353, dated Mar. 22, 2022, in 6 pages.

*Primary Examiner* — Shayne M. Gilbertson

(74) *Attorney, Agent, or Firm* — Procopio, Cory, Hargreaves & Savitch LLP

(57) ABSTRACT

The information processing device 1 functionally includes an acquisition means, an obstacle detection means, a ground detection means, a curb determination means, and a travelable area determination means. The acquisition means is configured to acquire point cloud data. The obstacle detection means is configured to detect obstacle points, which are data representing measured points of an obstacle, from the point cloud data. The ground detection means is configured to detect ground points, which are data representing measured points of a ground, from the point cloud data. The curb determination means is configured to determine, based on a travelable area of a vehicle determined at a processing time before a current processing time, that the ground points corresponding to a curb are the obstacle points. The travelable area determination means is configured to determine the travelable area at the current processing time, based on the obstacle points and the ground points.

12 Claims, 7 Drawing Sheets

(56) References Cited

U.S. PATENT DOCUMENTS

| | | | | |
|---|---|---|---|---|
| 2016/0131762 | A1 | 5/2016 | Kim et al. | |
| 2017/0067738 | A1* | 3/2017 | Kim | G05D 1/024 |
| 2019/0180117 | A1 | 6/2019 | Okada et al. | |
| 2021/0188312 | A1* | 6/2021 | Shikari | G06V 20/56 |
| 2023/0004744 | A1* | 1/2023 | Pfeiffer | G01S 7/4808 |

FOREIGN PATENT DOCUMENTS

| | | | |
|---|---|---|---|
| JP | 2008-082750 | A | 4/2008 |
| JP | 2011-028659 | A | 2/2011 |
| JP | 2016-045507 | A | 4/2016 |
| JP | 2019-027973 | A | 2/2019 |
| JP | 2019-106022 | A | 6/2019 |
| JP | 2020-149079 | A | 9/2020 |
| WO | 2021128777 | A1 | 7/2021 |

* cited by examiner

CONTROLLING A VEHICLE BASED ON A CURB AND GROUND DETECTION

CROSS-REFERENCE TO RELATED APPLICATIONS

This application is US National Stage of International Patent Application PCT/JP2022/005353, filed Feb. 10, 2022, the contents of which are incorporated herein by reference.

TECHNICAL FIELD

The present disclosure relates to processing of measured data.

BACKGROUND

Conventionally, there is known a ranging device configured to radiate a light to a target object of measurement to detect the reflected light from the target object of measurement, and thereby calculate the distance to the target object of measurement based on the time difference between the timing of radiating the light to the target object of measurement and the timing of detecting the reflected light from the target object of measurement. Patent Literature 1 discloses a forward vehicle recognition device for detecting the distance to the forward vehicle and the inclination by changing the lighting pattern for the projecting a patterned light based on the detection state of the patterned light.

PRIOR ART DOCUMENTS

Patent Literature

Patent Literature 1: JP 2008-082750A

SUMMARY

Problem to be Solved by the Invention

In the process of determining whether a target object of measurement is the ground or an obstacle based on measurement data outputted by a measurement device such as a lidar, it is generally difficult to identify data corresponding to a curb in the distance as an obstacle, due to the little number of obtained data points.

The above-described issue is an example of the issues which the present disclosure has been made to solve, and it is an example object of the present invention to provide an information processing device, a control method, a program, and a storage medium storing a program capable of suitably detecting a curb as an obstacle based on measurement data outputted by a measurement device.

Means for Solving the Problem

One invention is an information processing device including:

- an acquisition means configured to acquire measurement data outputted by a measurement device;
- an obstacle detection means configured to detect obstacle points, which are data representing measured positions of an obstacle, from the measurement data;
- a ground detection means configured to detect ground points, which is data representing measured positions of a ground, from the measurement data;
- a curb determination means configured to determine, based on a travelable area of a moving body determined at an immediately preceding processing time before a current processing time, that the ground points corresponding to a curb are the obstacle points; and
- a travelable area determination means configured to determine the travelable area at the current processing time, based on the obstacle points and the ground points.

Another invention is a control method executed by an information processing device, the control method including:

- acquiring measurement data outputted by a measurement device;
- detecting obstacle points, which are data representing measured positions of an obstacle, from the measurement data;
- detecting ground points, which is data representing measured positions of a ground, from the measurement data;
- determining, based on a travelable area of a moving body determined at an immediately preceding processing time before a current processing time, that the ground points corresponding to a curb are the obstacle points; and
- determining the travelable area at the current processing time, based on the obstacle points and the ground points.

Still another invention is a program causing a computer to:

- acquire measurement data outputted by a measurement device;
- detect obstacle points, which are data representing measured positions of an obstacle, from the measurement data;
- detect ground points, which is data representing measured positions of a ground, from the measurement data;
- determine, based on a travelable area of a moving body determined at an immediately preceding processing time before a current processing time, that the ground points corresponding to a curb are the obstacle points; and
- determine the travelable area at the current processing time, based on the obstacle points and the ground points.

DETAILED DESCRIPTION OF PREFERRED EMBODIMENTS

Figure 1:
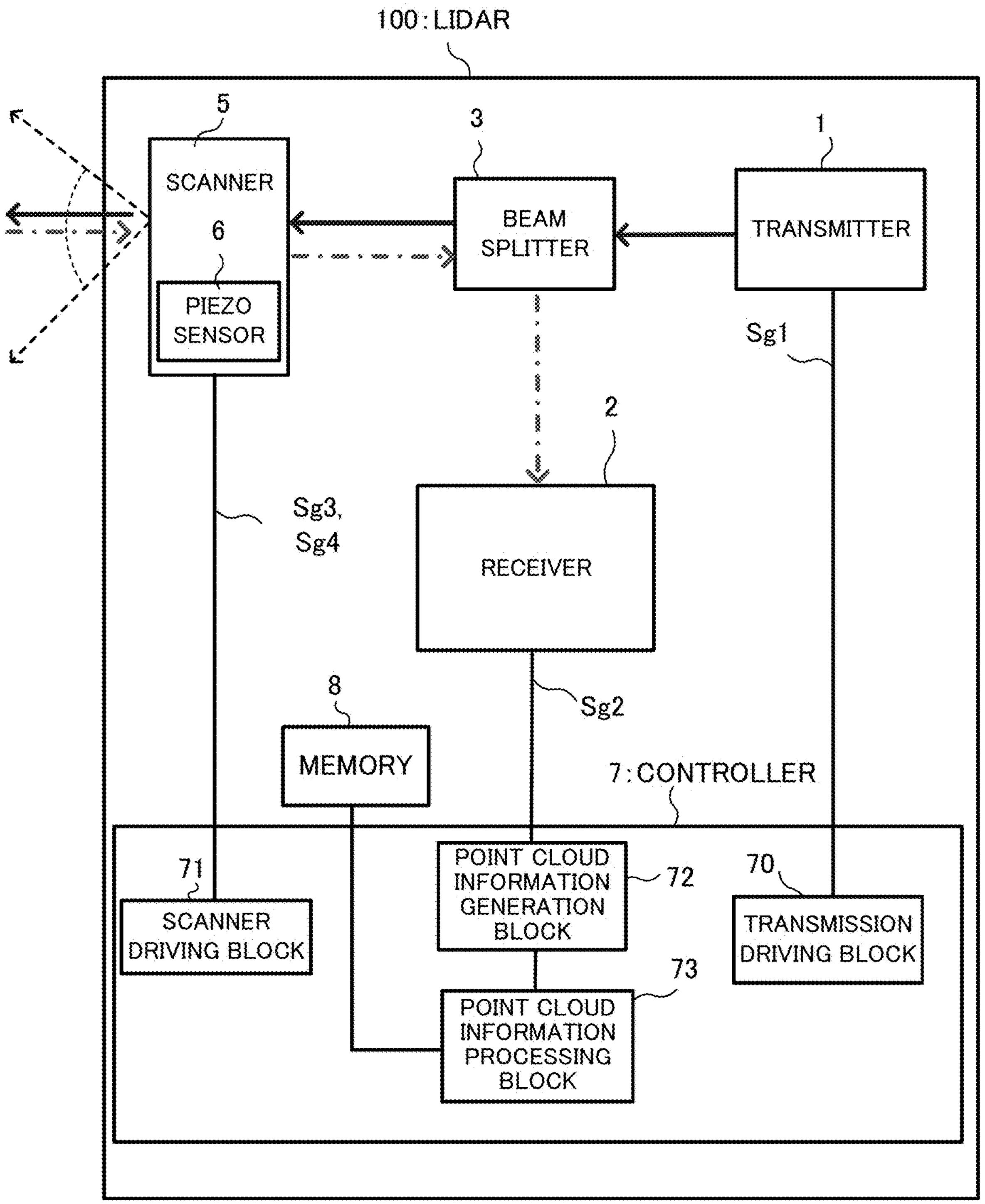
FIG. 1 It illustrates a schematic configuration of a lidar according to the embodiment.

According to a preferred embodiment of the present invention, the information processing device includes: an acquisition means configured to acquire measurement data outputted by a measurement device: an obstacle detection means configured to detect obstacle points, which are data representing measured positions of an obstacle, from the measurement data; a ground detection means configured to detect ground points, which is data representing measured positions of a ground, from the measurement data: a curb determination means configured to determine, based on a travelable area of a moving body determined at an immediately preceding processing time before a current processing time, that the ground points corresponding to a curb are the obstacle points; and a travelable area determination means configured to determine the travelable area at the current processing time, based on the obstacle points and the ground points. According to this embodiment, the information processing device can accurately identify ground points corresponding to a curb, which are erroneously detected as ground points, as obstacle points.

In one aspect of the information processing device, the curb determination means is configured to set a temporary travelable area at the current processing time based on the travelable area at the immediately preceding processing time, and determine, based on the temporary travelable area, that the ground points corresponding to the curb are the obstacle points. According to this aspect, the information processing device can accurately identify the ground points corresponding to the curb based on the travelable area at the immediately preceding processing time.

In another aspect of the information processing device, the curb determination means is configured to correct the ground points, which exist in a vicinity of boundary positions of the temporary travelable area, to be the obstacle points. According to this aspect, the information processing device can accurately identify the ground points corresponding to the curb.

In still another aspect of the information processing device, the curb determination means is configured to set the temporary travelable area based on the travelable area at the immediately preceding processing time and movement information of the measurement device. According to this aspect, the information processing device can accurately set the temporary travelable area at the current processing time.

In still another aspect of the information processing device, the information processing device further includes a ground point correction means configured to correct the obstacle points, which exist in the temporary travelable area, to be the ground points. According to this aspect, it is possible to suitably correct the incorrectly-determined obstacle points to be the ground points.

In still another aspect of the information processing device, the curb determination means configured to determine, based on consecutiveness in a direction in which a road extends, that the ground points corresponding to the curb are the obstacle points. According to this aspect, the information processing device can suitably correct the ground points corresponding to the curb to be the obstacle points.

In still another aspect of the information processing device, the travelable area determination means is configured to determine the whole travelable area at the current processing time by extending the travelable area within a predetermined distance which is determined based on the obstacle points and the ground points at the current processing time. According to this aspect, the information processing device can accurately determine the whole travelable area at the current processing time. In some preferred embodiments, the obstacle is an object existing near a boundary of a road. In further preferred embodiments, the object is at least one of a curb, vegetation, a road shoulder, and/or a fallen object near the boundary of the road.

In another preferred embodiment of the present invention, there is provided a control method executed by an information processing device, the control method including: acquiring measurement data outputted by a measurement device: detecting obstacle points, which are data representing measured positions of an obstacle, from the measurement data: detecting ground points, which is data representing measured positions of a ground, from the measurement data; determining, based on a travelable area of a moving body determined at an immediately preceding processing time before a current processing time, that the ground points corresponding to a curb are the obstacle points; and determining the travelable area at the current processing time, based on the obstacle points and the ground points. By executing this control method, the information processing device can accurately identify ground points corresponding to a curb, which are erroneously detected as ground points, as obstacle points.

In another preferred embodiment of the present invention, there is provided a program causing a computer to: acquire point cloud information, acquire measurement data outputted by a measurement device: detect obstacle points, which are data representing measured positions of an obstacle, from the measurement data: detect ground points, which is data representing measured positions of a ground, from the measurement data: determine, based on a travelable area of a moving body determined at an immediately preceding processing time before a current processing time, that the ground points corresponding to a curb are the obstacle points; and determine the travelable area at the current processing time, based on the obstacle points and the ground points. By executing the program, the computer can accurately can accurately identify ground points corresponding to a curb, which are erroneously detected as ground points, as obstacle points. In some embodiments, the program is stored in a storage medium.

EMBODIMENTS

Hereinafter, preferred embodiments of the present invention are described below with reference to drawings.

(1) Device Configuration

FIG. 1 shows a schematic configuration of a lidar 100 according to the embodiment. The lidar 100 is, for example, mounted on a vehicle that performs driving support such as autonomous driving. The lidar 100 radiates the laser light with respect to a predetermined angle range in the horizontal and vertical directions, and by receiving the returned light (also referred to as "reflected light") which is the laser light reflected at an object, the lidar 100 discretely measures the distance from the lidar 100 to the object and generates point cloud information indicating three-dimensional positions of the object. The lidar 100 is installed so as to include a ground surface such as a road surface in the measurement range.

As shown in FIG. 1, the lidar 100 mainly includes a transmitter 1, a receiver 2, a beam splitter 3, a scanner 5, a piezo sensor 6, a controller 7, and a memory 8.

The transmitter 1 is a light source configured to emit a pulsed laser light toward the beam splitter 3. For example, the transmitter 1 includes an infrared laser emitting element. The transmitter 1 is driven based on the driving signal "Sg1" supplied from the controller 7.

The receiver 2 is, for example, an avalanche photodiode (Avalanche Photo-Diode), and generates a detection signal "Sg2" corresponding to the amount of received light, and supplies the generated detection signal Sg2 to the controller 7.

The beam splitter 3 is transparent to the pulsed laser light emitted from the transmission unit 1. In contrast, the beam splitter 3 reflects the light reflected by the scanner 5 toward the receiver 2.

The scanner 5 is, for example, a mirror (MEMS mirror) according to an electrostatic drive system. Based on the driving signal "Sg3" supplied from the controller 7, the inclination (i.e., the optical scanning angle) of the scanner 5 is changed within a predetermined range. Then, the scanner 5 reflects the laser light, which passed through the beam splitter 3, toward the outside of the lidar 100, and reflects the reflected light incident from the outside of the lidar 100 toward the beam splitter 3. Further, a point, or its measurement data, measured through irradiation with the laser light within the measurement range of the lidar 100 is also referred to as "measured point".

The scanner 5 is provided also with the piezo sensor 6. The piezo sensor 6 detects the strain caused by the stress of the torsion bar which supports the mirror part of the scanner 5. The piezo sensor 6 supplies the generated detection signal "Sg4" to the controller 7. The detection signal Sg4 is used to detect the orientation of the scanners 5.

The memory 8 is configured by various volatile memories such as a RAM (Random Access Memory), a ROM (Read Only Memory), a flash memory, and a non-volatile memory. The memory 8 stores a program which is necessary for the controller 7 to execute a predetermined process. The memory 8 stores various parameters referred to by the controller 7. Further, the memory 8 stores point cloud information equivalent to a predetermined number of latest frames generated by the controller 7.

The controller 7 includes various processors such as a CPU (Central Processing Unit) and a GPU (Graphics Processing Unit). The controller 7 executes a program stored in the memory 8 to execute a predetermined process. The controller 7 is an example of a computer for executing a program. The controller 7 is not limited to be implemented by software using a program, it may be implemented by any combination of hardware, firmware, software and/or the like. The controller 7 may also be a user-programmable integrated-circuit, such as a FPGA (Field-Programmable Gate Array) and a microcontroller, an ASSP (Application Specific Standard Produce) and an ASIC (Application Specific Integrated Circuit).

The controller 7 functionally includes a transmission driving block 70, a scanner driving block 71, a point cloud information generation block 72, and a point cloud information processing block 73.

The transmission driving block 70 outputs a driving signal Sg1 for driving the transmitter 1. The driving signal Sg1 includes information regarding a light emission time of the laser light emitting element included in the transmitter 1 and information for controlling the emission intensity of the laser light emitting element. Based on the driving signal Sg1, the transmission driving block 70 controls the emission intensity of the laser light emitting element included in the transmitter 1.

The scanner driving block 71 outputs a driving signal Sg3 for driving the scanner 5. The driving signal Sg3 includes a horizontal driving signal corresponding to the resonant frequency of the scanner 5 and a vertical driving signal for vertical scanning. The scanner driving block 71 also detects the scan angle of the scanner 5 (i.e., the emission direction of the laser light) by monitoring the detection signal Sg4 outputted from the piezo sensor 6.

Based on the detection signal Sg2 supplied from the receiver 2, the point cloud information generation block 72 generates point cloud information indicative of, with respect to each measurement direction (i.e., emitting direction of the laser light), a distance (measurement distance) from the lidar 100, which is a reference point, to an object irradiated with the laser light. In this case, the point cloud information generation block 72 calculates, as the time of flight (Time of Flight) of the light, the time from the emission of the laser light to the detection of the reflected light by the receiver 2. Then, the point cloud information generation block 72 generates point cloud information which indicates a set of points each corresponding to a combination of: the measurement distance in accordance with the calculated time of flight; and the emitting direction (measurement direction) of the laser light received as the reflected light by the receiver 2. Then, the point cloud information generation block 72 supplies the generated point cloud information to the point cloud information processing block 73. Hereafter, point cloud information obtained in one cycle of the scanning for all measured points is also referred to as a frame of point cloud information.

The point cloud information can be regarded as an image, wherein each pixel of the image corresponds to each measurement direction and the pixel value of the each pixel is set as the measurement distance in the each measurement direction. In this case, pixels arranged in the vertical direction correspond to different emitting directions of the laser light in the elevation/depression angle and pixels arranged in the horizontal direction correspond to different emitting directions of the laser light in the horizontal angle. Then, the coordinate value, in the three-dimensional coordinate system with reference to the lidar 100, of each pixel is obtained based on a combination of the corresponding emitting direction and measurement distance. Hereinafter, the above-described three-dimensional coordinate system is also referred to as a "reference coordinate system". The reference coordinate system shall be a three-dimensional coordinate system with the horizontal plane (i.e., the plane parallel to the ground) as the X-Y axis and the height perpendicular to the horizontal plane as the Z-axis. Besides, the X-axis shall be parallel to the direction of the front of the vehicle (i.e., the extending direction of the road). For example, the origin of the reference coordinate system is set to the position of the lidar 100. The frame of the point cloud information obtained at the current processing time is referred to as "current frame", and the frame of the point cloud information obtained in the past is also referred to as "past frame".

The point cloud information processing block 73 executes a predetermined process on the point cloud information generated by the point cloud information generation block 72. For example, the point cloud information processing block 73 performs processing for removing data (also referred to as "noise data" or "false alarm data") generated by erroneously detecting an object in the point cloud information from the point cloud information. In this case, the point cloud information processing block 73 further adds, to the point cloud information, flag information indicating whether or not each measured point is noise data. Hereafter, a measured point corresponding to the data generated by detecting an actual object is referred to as "valid point", a measured point which is not a valid point (i.e., a measured point corresponding to the noise data) is referred to as "invalid point".

Further, the point cloud information processing block 73 classifies measured points indicated by the point cloud information supplied from the point cloud information generation block 72, and then adds the classification information representing the classification result to the point cloud information. Specifically, the point cloud information processing block 73 detects measured points (also referred to as "ground points") representing the ground (including road marking paints such as white lines), and measured points (also referred to as "obstacle points") representing an obstacle (including forward vehicle and any feature) existing on a road or around the road (including near the road boundary), respectively, and generates classification information representing the class of each measured point based on the detection result. Further, the point cloud information processing block 73 identifies a measured point (also referred to as "false positive obstacle point") which is erroneously determined (classified) to be an obstacle point due to the beam width (so-called footprint size) of the laser beam, and corrects the class of false positive obstacle points to be the ground points.

Furthermore, in view of the fact that a curb existing in the distance is hardly determined to be obstacle points (i.e., they are determined to be ground points instead), the point cloud information processing block 73 executes the distant curb point determination process, which is a process of correcting the class of measured points (also referred to as "distant curb points"), which represent a curb in the distance, to represent obstacle points. Furthermore, the point cloud information processing block 73 divides the current frame, which is regarded as an image, into grids and executes a travelable area determination process, which is a process of determining whether or not each grid represents an area (also referred to as "travelable area") on which the vehicle can travel.

The point cloud information processing block 73 stores point cloud information and information (also referred to as "travelable area information") regarding the travelable area for each frame or the like in the memory 8 in association with the time information indicating the processing time for the each frame. Details of the process executed by the point cloud information processing block 73 will be described later. The point cloud information processing block 73 is an example of the "acquisition means", "obstacle detection means", "ground detection means", "ground point correction means", "curb determination means", and "travelable area determination means". Further, the lidar 100 from which the point cloud information processing block 73 is excluded is an example of the "measurement device".

In some embodiments, the point cloud information and the travelable area information generated by the point cloud information processing block 73 may be outputted to, for example, a device (also referred to as "driving support device") for controlling the driving support such as autonomous driving of the vehicle. In this case, for example, based on the point cloud information, the control of the vehicle such as to avoid at least the obstacle points is performed. The driving support device may be, for example, an ECU (Electronic Control Unit) of a vehicle, or may be a vehicle-mounted device such as a car navigation device electrically connected to the vehicle. It is noted that the lidar 100 is not limited to a scan type lidar configured to scan the field of view with a laser light, and it may be a flash type lidar configured to generate three-dimensional data by diffusively radiating a laser light to the field of view of two-dimensional array structure sensor.

(2) Processing Overview

Figure 2:
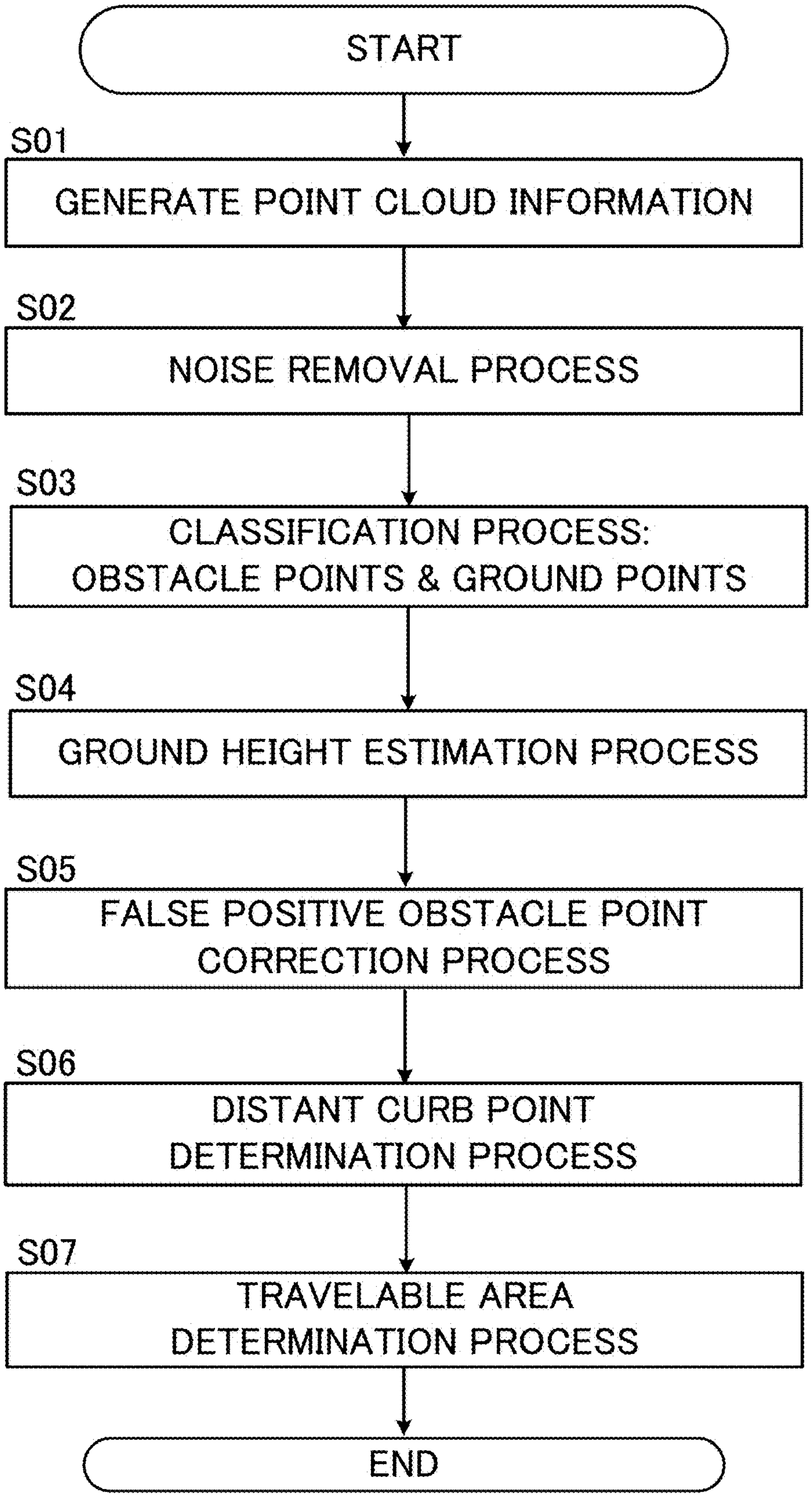
FIG. 2 It illustrates an example of a flowchart of the overall process according to the embodiment.

FIG. 2 is an example of a flowchart showing a procedure of the process of the point cloud information. The point cloud information processing block 73 repeatedly executes the process shown in FIG. 2, for each cycle of generating a frame of the point cloud information.

First, based on the detection signal Sg2, the point cloud information generation block 72 generates point cloud information (step S01). In this instance, the point cloud information generation block 72 generates the current frame of the point cloud information corresponding to the current process time, on the basis of the detected signal Sg2 generated by one cycle of scanning in the scanning target range by the lidar 100.

Next, the point cloud information processing block 73 executes the noise removal process, which is a process of removing the noise data from the point cloud information generated in step S01 (step S02). In this case, the point cloud information processing block 73 may perform any noise removal process. For example, the point cloud information processing block 73 determines that data of measured points, which correspond to the intensity of the reflected light received by the receiving unit 2 smaller than a predetermined threshold, is noise data, while determining that measured points corresponding to the data other than the noise data are valid points.

Next, the point cloud information processing block 73 executes a process of classifying the valid points of the point cloud information after the noise removal process (step S03). In this case, the point cloud information processing block 73 estimates the plane representing the ground based on the valid points indicated by the point cloud information after the noise removal process. Then, the point cloud information processing block 73 determines that the valid points existing at positions a predetermined threshold value or more higher than the estimated plane are obstacle points, and that the other valid points are ground points. In this case, for example, the point cloud information processing block 73 calculates the plane equation in the reference coordinate system by the least squares method using the point cloud data to be valid points, and thereby estimates the plane representing the ground.

Next, the point cloud information processing block 73 performs a process (also referred to as "ground height estimation process") of estimating the height of the ground on the basis of the ground points determined at step S03 (step S04). In this case, for example, the point cloud information processing block 73 estimates the height of the ground based on the plane equation calculated from the ground points.

Then, the point cloud information processing block 73 executes the false positive obstacle point correction process (step S05). In this case, as the first correction process, in consideration of the deviation in height and the deviation in depth in accordance with the footprint size, the point cloud information processing block 73 corrects the class of the measured points, which were classified as obstacle points due to reflection on the road marking paint such as a white line, to represent ground points. Specifically, in the first correction process, the point cloud information processing block 73 extracts, as a candidate for the false positive obstacle points, any obstacle point, at which the height difference between the obstacle point and the ground point in the vicinity of the obstacle point is equal to or smaller than a first threshold value, from the obstacle points. Then, among the above-mentioned extracted candidates, it corrects any candidate, which satisfies a condition that the difference in the depth distance from the ground point in the vicinity thereof is larger than a second threshold value, to represent a ground point. Hereafter, a measured point corrected to represent a ground point is also referred to as "corrected ground point". As the second correction process, the point cloud information processing block 73 detects, on the basis of the size of the cluster formed by the obstacle points, any false positive obstacle point that could not be corrected to be a corrected ground point in the first correction process, and corrects the detect false positive obstacle point to represent a corrected ground point. In addition, as the third correction process, the point cloud information processing block 73 resets, as an obstacle point, any point determined by mistake to be a corrected ground point in the first correction process or the second correction process. In the third correction process, the point cloud information processing block 73 corrects any correction ground point located above or below an obstacle point to represent an obstacle point, corrects the cluster of correction ground points having a predetermined number or more (e.g., three or more) of correction ground points consecutively arranged in the vertical direction (i.e., in such a direction that differentiates the elevation and depression angles of the emitted beam) to represent obstacle points, or corrects, based on the past frame, the correction ground points to represent obstacle points.

Next, the point cloud information processing block 73 executes the distant curb point determination process (step S06). In this case, the point cloud information processing block 73 sets a temporary travelable area (also referred to as "temporary travelable area") for the current frame, based on the travelable area information regarding the past frame at the immediately preceding processing time, and then identifies the distant curb points, which were classified as the ground points, based on the temporary travelable area. Then, the point cloud information processing block 73 corrects the class of the distant curb points to represent obstacle points.

Next, the point cloud information processing block 73 executes the travelable area determination process (step S07). In this case, the point cloud information processing block 73 divides the current frame, which is regarded as an image, into grids and performs a process of determining whether or not each grid is a travelable area.

(3) Distant Curb Point Determination Process

Figure 3:
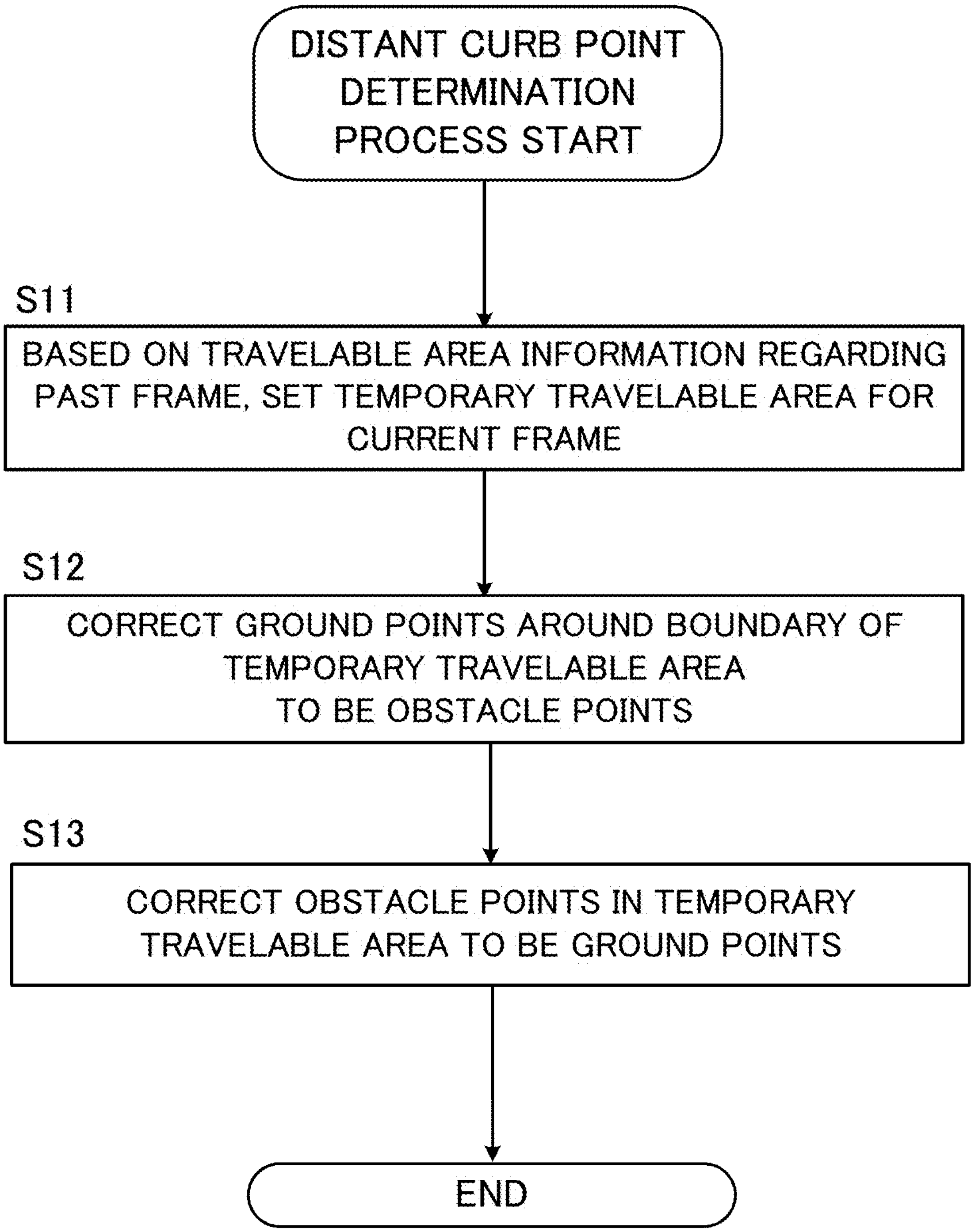
FIG. 3 It illustrates an example of a flowchart indicating the procedure of the distant curb point determination process.

Next, a detailed description will be given distant curb point determination process executed at step S06 in FIG. 2. FIG. 3 is an example of a flowchart showing the procedure of the distant curb point determination process.

First, the point cloud information processing block 73 sets a temporary travelable area for the current frame, on the basis of the travelable area information regarding the past frame corresponding to the preceding processing time immediately before the current processing time (step S11).

In this case, in some embodiments, based on the information (also referred to as "lidar movement information") related to the traveling of the lidar 100, the point cloud information processing block 73 sets the temporary travelable area. For example, the point cloud information processing block 73 generates lidar movement information indicating the traveling speed and the direction change of the lidar 100, based on vehicle speed pulse information, angular velocity information in the yaw direction of the vehicle, and the like, which are received from the vehicle on which the lidar 100 is mounted via a predetermined communication protocol such as a CAN. In another example, based on a detection signal output by various sensors such as an acceleration sensor provided in the lidar 100, the point cloud information processing block 73 generates lidar movement information.

Then, upon determining, based on the lidar movement information, that the lidar has not moved during the period between the past frame and the current frame, the point cloud information processing block 73 determines that there is no substantial change in the travelable area between successive frames, and sets the temporary travelable area to be the travelable area of the past frame.

On the other hand, upon determining, based on the lidar movement information, that the lidar has moved during the period between the past frame and the current frame, the point cloud information processing block 73 calculate the movement amount of the lidar 100 during the period between the past frame and the current frame based on the lidar movement information. Then, the point cloud information processing block 73 sets the temporary travelable area obtained by reflecting the calculated movement amount in the travelable area of the past frame. Thus, the point cloud information processing block 73 can set the temporary travelable area in consideration of the movement of the lidar 100.

Next, the point cloud information processing block 73 regards any ground point existing in the vicinity of the boundary of the temporary travelable area as a distant curb point and corrects it to be an obstacle point (step S12). In this case, for example, the point cloud information processing block 73 recognizes the boundary between the temporary travelable area and the other areas on the current frame. Then, the point cloud information processing block 73 selects measured points, which were classified as ground points, from measured points corresponding to pixels of the boundary and the neighboring pixels existing within a predetermined number of pixels from each pixel of the boundary, and corrects the selected measured points to represent obstacle points. Thus, the point cloud information processing block 73 can identify a small number of distant curb points as the obstacle points.

Next, the point cloud information processing block 73 corrects the obstacle points in the temporary travelable area to represent ground points (step S13). In this instance, the point cloud information processing block 73 corrects any obstacle points (except for the points corrected to represent obstacle points at step S12) existing on the temporary travelable area to represent ground points.

(4) Travelable Area Determination Process

Figure 4:
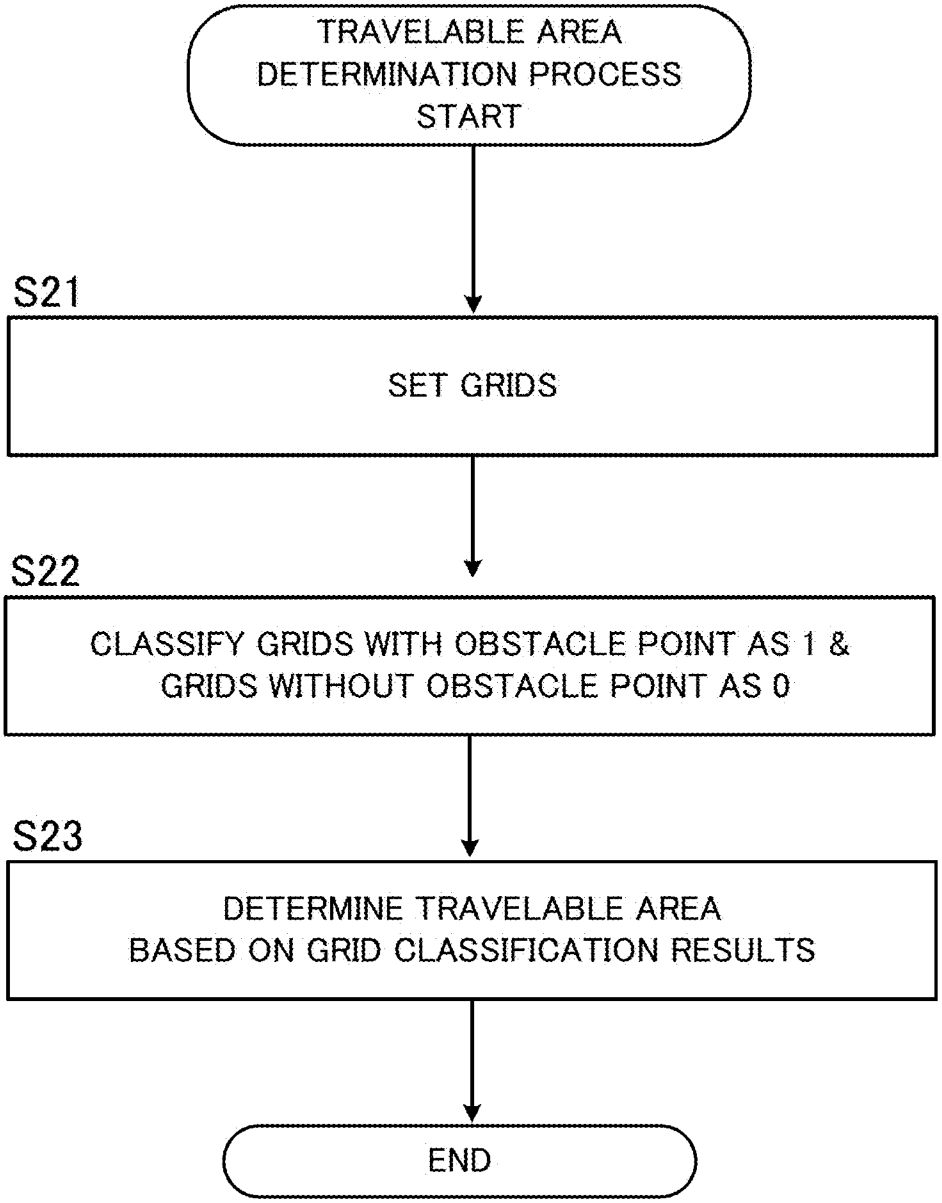
FIG. 4 It illustrates an example of a flowchart indicating the procedure of a travelable area determination process.

Next, the travelable area determination process executed at step S07 in FIG. 2 will be described in detail. FIG. 4 is an example of a flowchart illustrating a procedure of a travelable area determination process.

First, the point cloud information processing block 73 sets grids for the current frame (step S21). In this case, the point cloud information processing block 73 regards the current frame as an image and sets grids by dividing the image in the vertical and horizontal directions at intervals of a predetermined number of pixels. Each grid is a rectangular area with each vertical and horizontal length of the predetermined number of pixels.

Next, the point cloud information processing block 73 classifies each grid as "1" or "0", wherein any grid which includes an obstacle point is classified into "1" and any grid which does not include any obstacle point is classified into "0" (step S22). In this case, the point cloud information processing block 73 refers to the classification result indicating whether the measured point corresponding to each pixel in the grid is a ground point or an obstacle point, and performs the above-described grid classification.

Then, the point cloud information processing block 73 determines the travelable area corresponding to the current frame, on the basis of the classification results of respective grids (step S23). In this case, the point cloud information processing block 73 determines, for each horizontal line, that consecutive grids classified as "0" including the center of the each horizontal line constitutes the travelable area.

Figure 5:
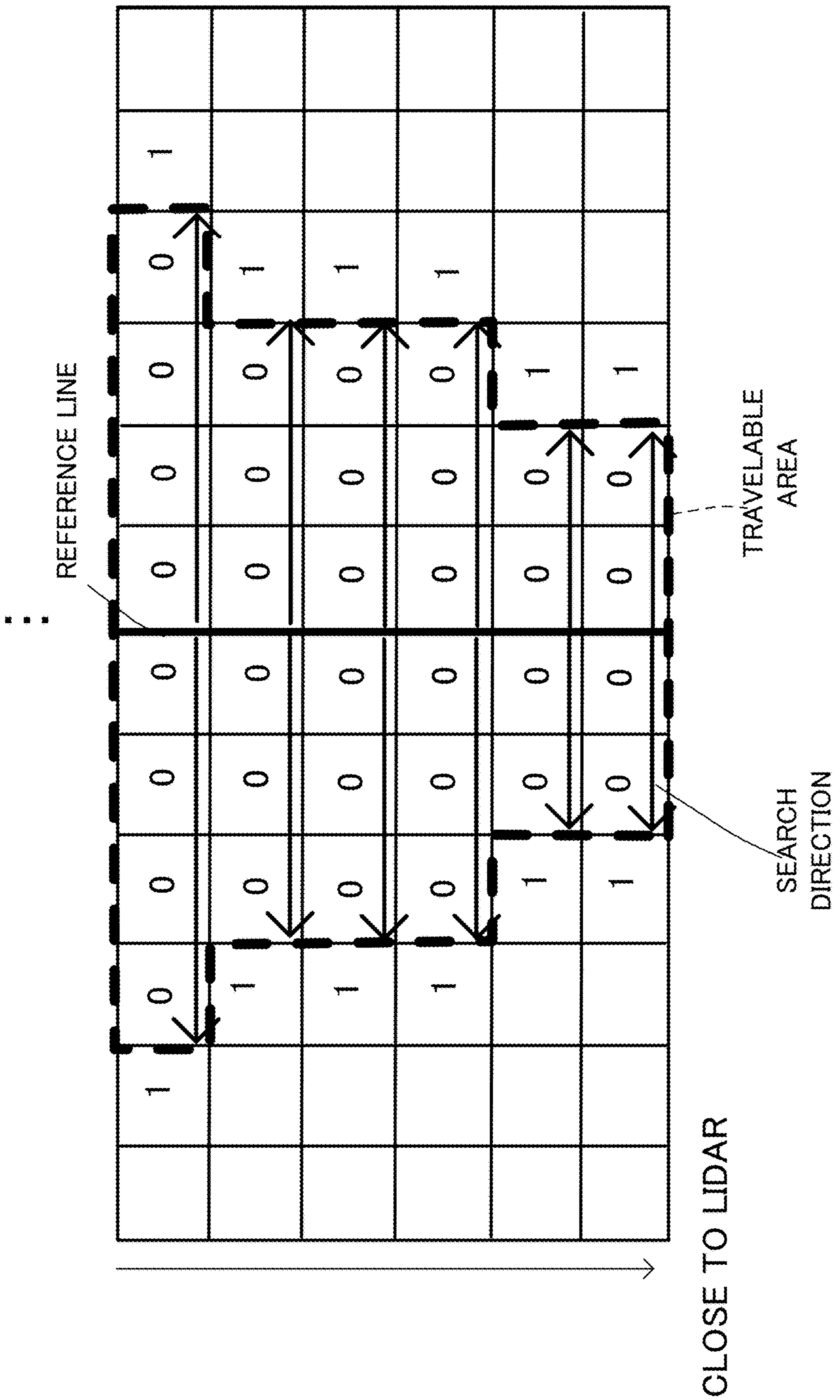
FIG. 5 It illustrates the outline of the determination method of the travelable area.

FIG. 5 illustrates an outline of the determination method of the travelable area at step S23. FIG. 5 illustrates the current frame with indications of a classification result of grids close to the lidar 100 and a travelable area set based on the classification results. Here, the "reference line" is a line representing the center of the image in the lateral direction.

In this case, the point cloud information processing block 73 searches, in order from the horizontal line of the grids in front, for grids to be 0 to the left from the reference line, and sets the grids immediately before the grid to be 1 as the travelable area. Similarly, the point cloud information processing block 73 searches for grids to be 0) to the right from the reference line, and sets the grids immediately before the grid to be 1 as the travelable area. Thereafter, the point cloud information processing block 73 performs the same process while shifting the horizontal line to be searched one by one upward.

In some embodiments, the point cloud information processing block 73 applies the above-described process to the horizontal lines of the grids which exist within a predetermined distance from the lidar 100 or within a predetermined number of grids from the bottom edge, to thereby determine a portion of the travelable area (i.e., the travelable area within a predetermined distance from the lidar 100). Then, the point cloud information processing block 73 determines the remaining travelable area by extending the determined portion of the travelable area in the depth direction. In this case, for example, based on a regression analysis such as least squares method, the point cloud information processing block 73 calculates straight lines, in the reference coordinate system, representing the left boundary line and the right boundary line of the determined portion of the travelable area, and then sets the area existing between these straight lines as the remaining travelable area. Thus, the point cloud information processing block 73 can suitably set the whole travelable area in the current frame.

(5) Modifications

Next, a description will be given of preferred modifications to the above-described embodiment. The following modifications may be applied to the above-described embodiment in combination.

(First Modification)

As the distant curb point determination process, the point cloud information processing block 73 may perform a process (also referred to as "distant curb point determination second process") of determining the distant curb points based on the consecutiveness of the distant curb points in a direction in which the road extends, in addition to the process of determining the distant curb points based on the travelable area. In this case, the point cloud information processing block 73 determines the distant curb points on the assumption that the distant curb points consecutively exist (extend) in the X-axis direction.

Figure 6:
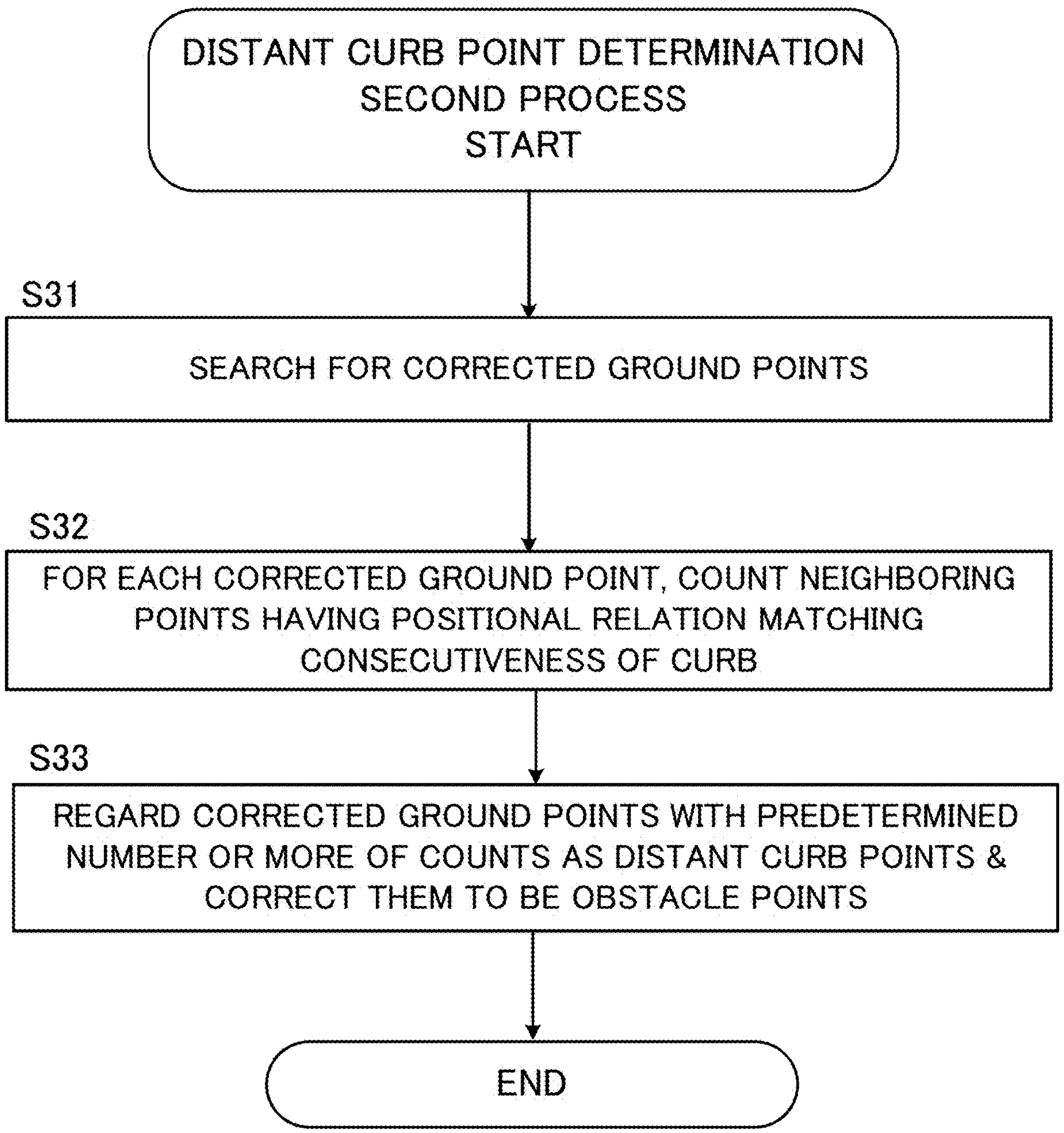
FIG. 6 It illustrates an example of a flowchart of a distant curb point determination second process.

FIG. 6 is an example of a flowchart indicative of the distant curb point determination second process. The point cloud information processing block 73 executes the process of this flowchart at step S06 in FIG. 2 together with the flowchart of the distant curb point determination process shown in FIG. 3.

First, in the current frame, the point cloud information processing block 73 searches the current frame for corrected ground points that were corrected from the obstacle points to the ground points through the false positive obstacle point correction process or the like (step S31). In general, when the footprint size is large, it is difficult to determine a distant curb point as an obstacle point, and the distant curb point is corrected from an obstacle point to a ground point in the false positive obstacle point correction process. Instead of performing the process at step S31, the point cloud information processing block 73 may search for the ground points (including the correction ground points) existing in the vicinity of the boundary of the road by any methods to perform the processes at following steps using the searched points.

Next, for each of the searched correction ground points, the point cloud information processing block 73 counts neighboring points having a positional relation that matches the consecutiveness of a curb (step S32). Specifically, for each corrected ground point, the point cloud information processing block 73 counts the number of the neighboring points, which correspond to the obstacle points or the correction ground points or the corrected obstacle points (among of which only the obstacle points may be used instead) in such a condition that the distance from the each corrected ground point on the Y-Z plane is equal to or smaller than a threshold value. The neighboring point in this case is a measured point of the current frame corresponding to a pixel which satisfies a condition that the deviation in the vertical direction from the each corrected ground point is equal to or smaller than a predetermined number of lines (e.g., 30 lines) and the deviation in the direction along the horizontal line is equal to or smaller than a predetermined pixel difference (e.g., three pixels).

Then, the point cloud information processing block 73 regards, as distant curb points, the corrected ground points in a state where the number of the counts at step S32 is equal to or larger than a predetermined number, and corrects the corrected ground points to be obstacle points (step S33). Instead of executing the process of this flowchart separately from the process of the flowchart shown in FIG. 3, the point cloud information processing block 73 may consider the consecutiveness of the distant curb points in the process at step S12 in FIG. 3. In this instance, at step S12, the point cloud information processing block 73 corrects the ground points in the vicinity of the boundary of the temporary travelable area, in a state where the above-described condition regarding the consecutiveness is satisfied, to be obstacle points.

According to this modification, it is possible to determine the distant curb points with higher accuracy by utilizing the characteristics that the distant curb points are consecutive in the X-axis direction.

(Second Modification)

The configuration of the lidar 100 is not limited to the configuration shown in FIG. 1. For example, a device separate from the lidar 100 may be equipped with the functions corresponding to the point cloud information processing block 73 of the control unit 7.

Figure 7:
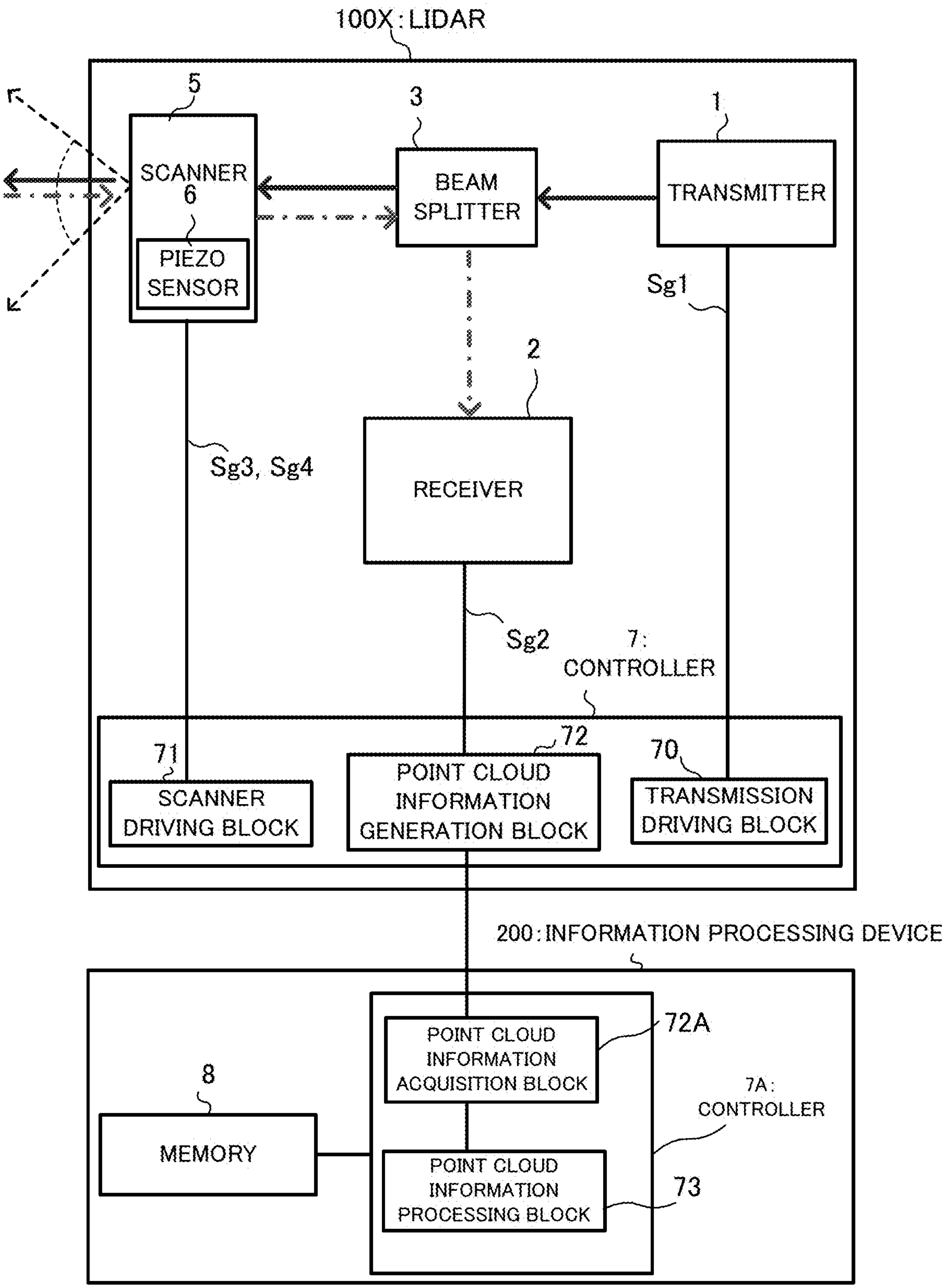
FIG. 7 It illustrates a configuration of a lidar system according to a modification.

FIG. 7 is a configuration diagram of a lidar system according to the modification. The lidar system includes a lidar 100X and an information processing device 200. In this instance, the lidar 100X supplies the point cloud information generated by the point cloud information generation block 72 to the information processing device 200.

The information processing device 200 includes a controller 7A and a memory 8. The memory 8 stores the data required for the controller 7A to execute the process. The controller 7A functionally includes a point cloud information acquisition block 72A and a point cloud information processing block 73. The point cloud information acquisition block 72A receives the point cloud information generated by the point cloud information generation block 72 of the lidar 100X, and supplies the received point cloud information to the point cloud information processing block 73. The point cloud information processing block 73 performs the same process as the process, which is executed by the point cloud information processing block 73 according to the above-described embodiments on the point cloud information supplied from the point cloud information acquisition block 72A.

The information processing device 200 may be realized by a driving support device. The parameter information necessary for processing may be stored by another device having a memory that can be referenced by the information processing device 200. The configuration according to this modification also enables the information processing device 200 to generate accurate classification information regarding the measured points of the point cloud information generated by the lidar 100X.

As described above, the control unit 7 of the lidar 100 according to the embodiment functions as an information processing device in the present invention, and functionally includes an acquisition means, an obstacle detection means, a ground detection means, a curb determination means, and a travelable area determination means. The acquisition means is configured to acquire point cloud data. The obstacle detection means is configured to detect obstacle points, which are data representing measured points of an obstacle, from the point cloud data. The ground detection means is configured to detect ground points, which are data representing measured points of a ground, from the point cloud data. The curb determination means is configured to determine, based on a travelable area of a vehicle determined at an immediately preceding processing time before a current processing time, that the ground points corresponding to a curb are the obstacle points. The travelable area determination means is configured to determine the travelable area at the current processing time, based on the obstacle points and the ground points. Thus, the lidar 100 can accurately identify a curb, which tends to be identified as ground points, as obstacle points.

In the embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)).

While the present invention has been described with reference to the embodiments, the present invention is not limited to the above embodiments. Various modifications that can be understood by a person skilled in the art can be made to the configuration and details of the present invention within the scope of the present invention. Namely, the present invention includes, of course, various modifications that may be made by a person skilled in the art according to the entire disclosure including claims and technical ideas. In addition, all Patent and Non-Patent Literatures mentioned in this specification are incorporated by reference in its entirety.

DESCRIPTION OF REFERENCE NUMERALS

1 Transmitter
2 Receiver
3 Beam splitter
5 Scanner
6 Piezo sensor
7, 7A Control unit
8 Memory
100, 100X Lidar
200 Information processing device

What is claimed is:

1. An information processing device comprising:
a processor coupled to a memory storing instructions for the processor to:
acquire measurement data outputted by a measurement device;
detect obstacle points, which are data representing measured positions of an obstacle, from the measurement data;
detect ground points, which is data representing measured positions of a ground, from the measurement data;
determine, based on a travelable area of a moving body determined at an immediately preceding processing time before a current processing time, that the data corresponding to a curb among the detected ground points are the obstacle points that have been erroneously detected as ground points;
determine the travelable area at the current processing time, based on the obstacle points and the ground points,
wherein the processor is configured to correct the ground points, which exist in a vicinity of boundary positions of the temporary travelable area, to be the obstacle points; and
control a vehicle based on the determined travelable area.

2. The information processing device according to claim 1,
wherein the processor is configured to:
set a temporary travelable area at the current processing time based on the travelable area at the immediately preceding processing time, and
determine, based on the temporary travelable area, that the ground points corresponding to the curb are the obstacle points.

3. The information processing device according to claim 2,
the processor is configured to set the temporary travelable area based on the travelable area at the immediately preceding processing time and movement information of the measurement device.

4. The information processing device according to claim 2,
wherein the processor is configured to correct the obstacle points, which exist in the temporary travelable area, to be the ground points.

5. The information processing device according to claim 1,
wherein the processor is configured to determine, based on consecutiveness in a direction in which a road extends, that the ground points corresponding to the curb are the obstacle points.

6. The information processing device according to claim 1, wherein the processor is configured to determine an entirety of the travelable area at the current processing time by extending the travelable area within a predetermined distance which is determined based on the obstacle points and the ground points at the current processing time.

7. The information processing device according to claim 1, wherein the obstacle is an object existing near a boundary of a road.

8. The information processing device according to claim 7, wherein the object is at least one of a curb, vegetation, a road shoulder, and/or a fallen object near the boundary of the road.

9. A control method executed by an information processing device, the control method comprising:

acquiring measurement data outputted by a measurement device;

detecting obstacle points, which are data representing measured positions of an obstacle, from the measurement data;

detecting ground points, which is data representing measured positions of a ground, from the measurement data;

determining, based on a travelable area of a moving body determined at an immediately preceding processing time before a current processing time, that the data corresponding to a curb among the detected ground points are the obstacle points that have been erroneously detected as ground points;

determining the travelable area at the current processing time, based on the obstacle points and the ground points, correcting the ground points, which exist in a vicinity of boundary positions of the temporary travelable area, to be the obstacle points; and controlling a vehicle based on the determined travelable area.

10. A non-transitory computer readable medium storing a program causing a computer to:

acquire measurement data outputted by a measurement device;

detect obstacle points, which are data representing measured positions of an obstacle, from the measurement data;

detect ground points, which is data representing measured positions of a ground, from the measurement data;

determine, based on a travelable area of a moving body determined at an immediately preceding processing time before a current processing time, that the data corresponding to a curb among the detected ground points are the obstacle points that have been erroneously detected as ground points;

determine the travelable area at the current processing time, based on the obstacle points and the ground points, correct the ground points, which exist in a vicinity of boundary positions of the temporary travelable area, to be the obstacle points; and control a vehicle based on the determined travelable area.

11. The information processing device according to claim 1, wherein the processor is configured to divide a current frame into grids and classify each grid based on whether the grid includes an obstacle point, and to determine the travelable area based on classification of the grids.

12. The information processing device according to claim 11, wherein the processor is configured to determine, for each horizontal line of the grids, that consecutive grids not including an obstacle point from a reference line constitute the travelable area.

* * * * *